March 20, 1962 P. D. S. ST. PIERRE ETAL 3,026,177
PROCESS FOR PRODUCING TRANSPARENT
POLYCRYSTALLINE ALUMINA
Filed April 25, 1961
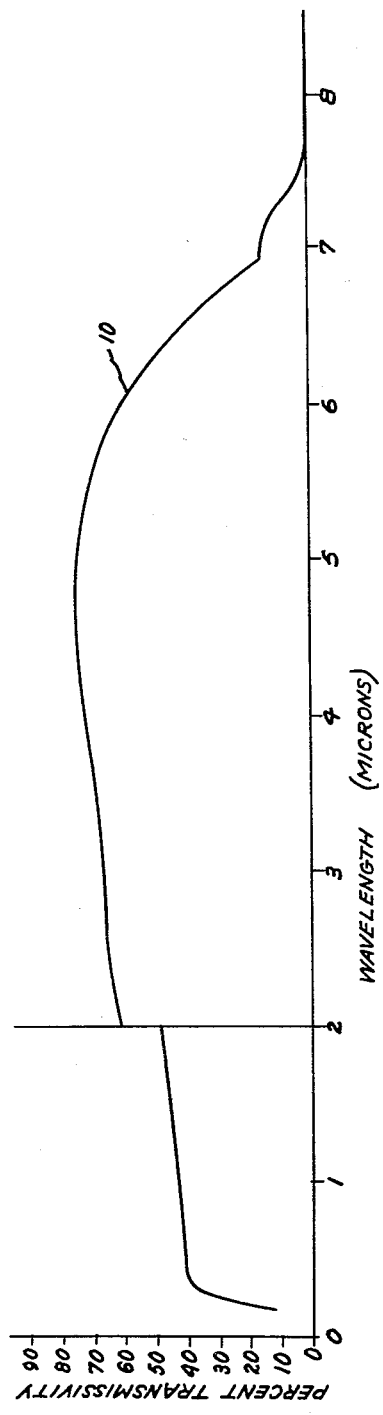
Inventors:
Philippe D.S. St. Pierre,
Arno Gatti,
by Richard A. Speer
Their Attorney.

3,026,177
PROCESS FOR PRODUCING TRANSPARENT POLYCRYSTALLINE ALUMINA

Philippe D. S. St. Pierre and Arno Gatti, Schenectady, N.Y., assignors to General Electric Company, a corporation of New York
Filed Apr. 25, 1961, Ser. No. 105,496
4 Claims. (Cl. 23—142)

This invention relates to ceramic bodies and more particularly to polycrystalline bodies of substantially pure alumina having improved optical transmission properties, and to methods for forming such alumina bodies.

This application is a continuation-in-part of copending application Serial No. 783,451, filed December 29, 1958, and assigned to the same assignee as the present invention.

Single crystal bodies of optical sapphire are known to possess highly desirable optical and physical characteristics, such as high strength, high density and a high degree of transparency, as well as the ability to retain these properties, to a large degree, at elevated temperatures. Since the cost of producing single crystal sapphire bodies is comparatively great, they have generally only been used in situations where the requirements were such that no adequate substitute was available, or where cost was not a material factor.

The size and shape of bodies which can be made from single crystals are comparatively limited, while polycrystalline alumina bodies made according to existing practices, with one exception, are of little or no value where radiant energy transmission properties must be considered, due to their inherent opacity. The one exception is the polycrystalline body and process described and claimed in the copending application of Robert L. Coble, Serial No. 80,965, filed January 3, 1961, and assigned to the same assignee as the present invention.

Since polycrystalline bodies of many different sizes and shapes can be fabricated readily from finely-divided alumina, it is apparent that there are many uses where transparency would be an important factor. For example, polycrystalline alumina gas envelopes for use in high temperature lamps, particularly those of the arc discharge type, would be extremely useful if the alumina were transparent. Such articles cannot be made of single crystals, or at least not in very large sizes, and while an envelope of desired size and shape may be made of powdered alumina, according to most existing practices it would be of no value in a lamp due to lack of adequate radiant energy transmission.

Envelopes of transparent alumina may in certain instances be more useful than, for example, fused-silica envelopes for infrared sources because of better intrinsic infrared transmissivity. Windows for use in high temperature applications, such as furnaces, high speed missiles, etc., might also be advantageously made of transparent polycrystalline alumina. Thus, transparent alumina bodies may find general use in applications where a substantial degree of transmissivity is needed and where the material must retain its transparency and mechanical strength at elevated temperatures.

The degree of transparency in the present instance is determined by the amount of in-line transmissivity of radiant energy of varying wavelengths through the polycrystalline body. The percent in-line transmission is the ratio of the amount of radiant energy entering a given sample, with a specified entrance cone, to the amount of emergent radiant energy contained within a cone having the same angular limits as the entrance cone. In this case, the in-line transmission values are based upon cones of radiant energy of about 6 degrees.

The values obtained in this manner are felt to be more significant with respect to the transparency of the alumina bodies than total transmission values, due to the fact that total transmission percentages well above 90 can be obtained in a material, for example, frosted glass, without achieving any substantial degree of transparency.

The impurity content of the alumina powder used to make the transparent bodies should not be more than 1.0 percent and preferably not more than 0.3 percent if optimum transmissivity is to be obtained. If the percentage is too great, that is, the purity of the alumina is too low, the in-line transmission will decrease. Coloring impurities which may be present and should be kept to a minimum are iron, nickel, cobalt, manganese and chromium. A principal object of this invention is to provide a polycrystalline, substantially pure body of alumina having substantial transparency.

It is another object of this invention to provide high-density polycrystalline bodies of alumina capable of in-line transmission of at least 10 percent of the radiant energy having wavelengths of from about 0.185 to about 7.3 microns per 0.5 millimeter of body thickness.

Another object of this invention is to provide a process for producing a substantially transparent body of polycrystalline alumina from finely divided alumina powder.

Other objects and advantages of this invention will be in part obvious and in part explained by reference to the accompanying specification and drawing.

In the drawing:
The FIGURE is a curve showing the transmissivity of a body produced according to the present invention.

Briefly stated, the present invention provides high-density and high-purity polycrystalline alumina bodies which contain no additives to retard grain growth, having an in-line transmission of not less than 10 percent of radiant energy ranging from about 0.185 to about 7.3 microns in length per 0.5 millimeter body thickness, and also provides processes for making such bodies.

Generally, the method for forming an alumina body having the desired optical characteristics comprises compacting finely-divided alumina having only nominal percentages of impurities, as already mentioned, effecting a first firing of the compact at a temperature of from about 1650° C. to 1750° C. for from about 50 to 300 minutes, and subsequently effecting a second firing at a temperature of from about 1800° C. to 2000° C. for not less than about 15 minutes. With regard to the length of the second firing, the longer the body is held at the temperature, the greater the degree of transparency. Of course, after a certain time, for example, 1000 to 2000 minutes, the amount of improvement does not generally justify the cost of continuing the firing. Also, the transparency can be achieved by merely raising the temperature of the body from the first to the second firing temperature or by permitting intermediate cooling to occur.

The firing temperatures and times are quite important to obtaining the required degree of transparency and the second firing operation is necessary to obtain any transparency whatsoever. For example, if the compact is fired at 1600° C. for 3000 minutes or at 1700° C. for 1000 minutes, the resultant body is white and opaque and the opaqueness cannot be removed by subsequent firing at the elevated temperatures. If, however, the initial firing is held for from about 50 to 300 minutes within the temperature range of 1650° C. to 1750° C., the second firing will result in the desired optical properties.

As an example of a body produced according to the present invention, a quantity of sub-micron size alumina powder was compacted under a pressure of 20 tons per square inch, pressures from 5 to 40 tons per square inch being acceptable although not critical, and the resultant compact given the first firing in a hydrogen atmosphere at a temperature of 1700° C. for a time of 100 minutes. The body, of course, was opaque and exhibited no substantial degree of transparency. Following the initial firing or sintering operation, the second firing was carried out in hydrogen for a period of 1000 minutes at a temperature of 1900° C.

After the second firing, the body was ground and polished to a final thickness of 0.49 millimeter and placed in a spectrophotometer to measure the in-line transmissivity of radiant energy having wavelengths of from about 0.185 to about 8.0 microns. The percentage of in-line transmission of radiant energy of these wavelengths is shown in the figure.

Since the measurements were made on two different types of spectrophotometers, slight apparent differences in the degree of transmissivity were seen, notably at a wavelength of two microns where the specimen was transferred from one machine to the other. However, the percentage of in-line transmission was still well above that heretofore obtained in pure alumina bodies. To measure the transmission from 0.185 to about 2.0 microns, a Cary recording spectrophotometer, Model 14MS, Serial 7, manufactured by the Applied Physics Corporation, Pasadena, California, was used. From 2 microns to 8 microns, a Perkin-Elmer spectrophotometer was used. A description of this latter apparatus can be found in the Journal of the Optical Society of America, vol. 40, No. 1, pp. 29 to 41, January, and No. 2, pp. 93 to 101, February, 1950. In both machines, the entrance and emergent cones of radiant energy had about a 6° spread, and in the Cary machine, the specimen was located at the mid-point of the sample holder. The following Table I lists some of the transmission values at various wavelengths.

Table I

| Wavelengths (microns): | Percent in-line transmissivity |
| --- | --- |
| 0.185 | 10.0 |
| 0.50 | 40.0 |
| 1.00 | 42.5 |
| 2.00 | 49.0 |
| 2.00 | 61.0 |
| 3.00 | 66.0 |
| 4.00 | 71.0 |
| 5.00 | 73.0 |
| 6.00 | 50.0 |
| 7.00 | 14.0 |
| 8.00 | 00.0 |

Thus, the bodies provide substantial transparency over a wide range of wavelengths, particularly within the visible and infrared bands where at least 40 percent in-line transmission is present. This can be quite clearly seen by referring to curve 10 of the drawing which shows that at least 40 percent transmissivity of all wavelengths from about 0.35 to 7.3 microns takes place. Curve 10 also shows the apparent difference in transmissivity at 2 microns caused by the use of different recording spectrophotometers.

While the exact mechanism by which the polycrystalline alumina may be compacted or sintered into a coherent polycrystalline transparent body is not clearly understood, the following is offered as one possible explanation.

The attainment of substantial transparency in a high-density polycrystalline body is dependent upon a number of factors, as indicated by the formula $I/I^0 = (e^{-\alpha d})$. In this formula, I represents the intensity of transmitted light, $I_0$ the intensity of incident light, $\alpha$ the absorption coefficient, and $d$ the thickness of the specimen. Ordinarily, surface reflection and light scattering would also be considered but since we are presently concerned only with the percent in-line transmission, these factors need not be taken up. Also, insofar as it represents the degree of porosity of the alumina body, density may be considered as a factor affecting the degree of transmissivity. The pores, which are caused by gases trapped within the body, scatter light rays and in effect increase the path length $d$ through the solid. Since a material of higher density would tend to also have a reduced pore content, it may be assumed that the density has at least an indirect effect on the degree of transmissivity.

Grain boundary cracks resulting from abnormal or excessively large rates of grain growth act essentially as pores in their effect on transmissivity. That is, boundary cracks, by acting as pores, in effect increase the path length $d$ and reduce the resultant transparency of the body. It will be appreciated that grain growth must be sufficiently suppressed to avoid grain boundary cracking and also to prevent trapping of pores within the body.

As already mentioned, it is felt that the preceding difficulties are overcome by the present process. The problem of excessive grain boundary cracking, excessive rate of grain growth and consequent pore entrapment is overcome by means of the initial or first firing stage which causes grain growth to proceed at a relatively slow rate and permit trapped gas to escape from the body. After the bodies have been given the first firing, the major proportion of the trapped pores are gone from the body and the increased temperature provided by the second firing permits removal of any remaining trapped pores. Even though the rate of grain growth is somewhat higher at the elevated temperature, it takes place only for a limited period and the body is made transparent.

Thus, the present invention makes possible the production of transparent polycrystalline alumina bodies by means of a process which can be easily carried out without use of special treating apparatus.

What we claim as new and desire to secure by Letters Patent of the United States is:

1. A process for producing a transparent polycrystalline alumina body, comprising preparing a compact of substantially pure, finely-divided alumina, subjecting the compact to a first firing in a hydrogen atmosphere at a temperature of from about 1650° C. to 1750° C. for a period from about 50 to 300 minutes to effect removal of gas-containing pores from the body, and subjecting the body to a second firing in a hydrogen atmosphere at a temperature of from about 1800° C. to 2000° C. for a period of not less than 15 minutes to remove additional pores and improve the transparency of the body.

2. A process for producing a transparent polycrystalline alumina body, comprising preparing a compact of substantially pure, finely-divided alumina, subjecting the compact to a first firing in a hydrogen atmosphere at a temperature of about 1700° C. for a period of from 50 to 300 minutes to effect removal of gas-containing pores from the body, and subjecting the body to a second firing in a hydrogen atmosphere at a temperature of 1900° C. for a period of not less than 15 minutes to remove additional pores and improve the transparency of the body.

3. A process for producing a transparent polycrystalline alumina body, comprising preparing a compact of substantially pure, finely-divided alumina, subjecting the compact to a first firing in a hydrogen atmosphere at a temperature of from about 1650° C. to 1750° C. for a period of about 100 minutes to effect removal of gas-containing pores from the body, and subjecting the body to a second firing in a hydrogen atmosphere at a temperature of from 1800° C. to 200° C. for a period of about 1000 minutes to remove additional pores and improve the transparency of the body.

4. A process as described in claim 1 wherein the second firing is carried out at a temperature of from about 1850° C. to 1950° C.

(References on following page)

References Cited in the file of this patent

UNITED STATES PATENTS

| | | |
|---|---|---|
| 1,161,620 | Coulter | Nov. 23, 1915 |
| 2,968,551 | North et al. | Jan. 17, 1961 |

OTHER REFERENCES

Navias: "Journal of the American Ceramic Society," vol. 37, pages 329–350, 1954; vol. 15, pages 234–251, 1932.

Webb et al.: "Journal of Applied Physics," vol. 28, pages 1449–1454, December 1957.